(12) United States Patent  (10) Patent No.: US 8,161,627 B2
Bonhote et al.  (45) Date of Patent: Apr. 24, 2012

(54) METHOD OF MAKING A WRITE HEAD LAPPING GUIDE ABOUT ALIGNED TO A NON-MAGNETIC LAYER SURROUNDING A WRITE POLE

(75) Inventors: Christian Rene Bonhote, San Jose, CA (US); Jeffrey S. Lille, Sunnyvale, CA (US); Vladimir Nikitin, Campbell, CA (US); Aron Pentek, San Jose, CA (US); Neil Leslie Robertson, Palo Alto, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 1031 days.

(21) Appl. No.: 12/110,705

(22) Filed: Apr. 28, 2008

(65) Prior Publication Data

US 2009/0268348 A1    Oct. 29, 2009

(51) Int. Cl.
*G11B 5/127* (2006.01)
*H04R 31/00* (2006.01)

(52) U.S. Cl. ............... 29/603.14; 29/603.12; 29/603.13; 29/603.15; 29/603.16; 29/603.18; 360/121; 360/122; 360/313; 360/317; 451/5; 451/8; 451/10; 451/37; 451/41

(58) Field of Classification Search ............... 29/603.12, 29/603.14–603.16, 603.18; 360/121, 122, 360/215.51, 125.42, 125.46, 125.59, 126.64, 360/313, 317; 451/5, 8, 10, 36, 37, 41
See application file for complete search history.

(56) References Cited

U.S. PATENT DOCUMENTS

| | | | |
|---|---|---|---|
| 4,991,046 A | 2/1991 | Adamson et al. | 360/122 |
| 6,609,949 B2 | 8/2003 | Anderson et al. | 451/5 |
| 6,728,067 B2 | 4/2004 | Crawforth et al. | 360/234.3 |
| 6,884,148 B1 | 4/2005 | Dovek et al. | 451/5 |
| 7,016,143 B2 | 3/2006 | Kirschenbaum et al. | 360/77.12 |
| 7,287,316 B2 | 10/2007 | Kasahara et al. | 29/737 |
| 7,603,762 B2 * | 10/2009 | Baer et al. | 29/603.12 |
| 7,770,281 B2 * | 8/2010 | Pentek | 29/603.12 |
| 7,788,796 B2 * | 9/2010 | Hsiao et al. | 29/603.16 |
| 7,861,400 B2 * | 1/2011 | Lille | 29/603.09 |
| 2006/0028770 A1 | 2/2006 | Etoh et al. | 360/313 |
| 2006/0168798 A1* | 8/2006 | Naka | 29/603.16 |
| 2008/0141522 A1* | 6/2008 | Baer et al. | 29/603.12 |
| 2008/0144215 A1* | 6/2008 | Hsiao et al. | 360/119.04 |
| 2009/0117407 A1* | 5/2009 | Zheng et al. | 428/810 |
| 2009/0152235 A1* | 6/2009 | Hsiao et al. | 216/22 |
| 2009/0197208 A1* | 8/2009 | Nikitin et al. | 430/313 |

* cited by examiner

*Primary Examiner* — Paul D Kim
(74) *Attorney, Agent, or Firm* — Zilka-Kotab, PC

(57) ABSTRACT

A method in one embodiment includes forming an electric lapping guide layer; forming a write pole; forming a first gap layer over the write pole; masking a portion of the first gap layer for defining a window over the write pole and at least a portion of the electric lapping guide layer; and forming a bump over the write pole in the window. Additional methods and systems are presented.

21 Claims, 15 Drawing Sheets

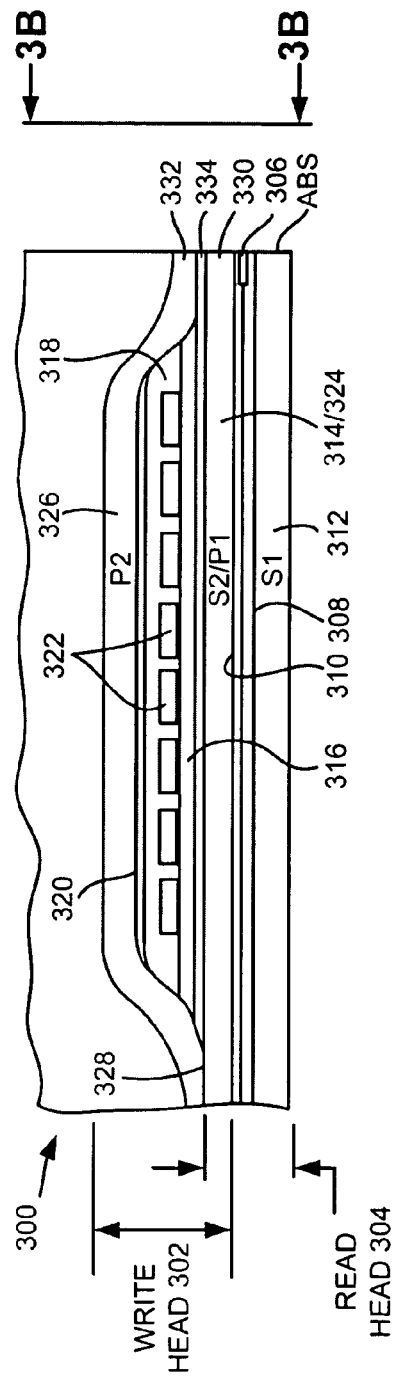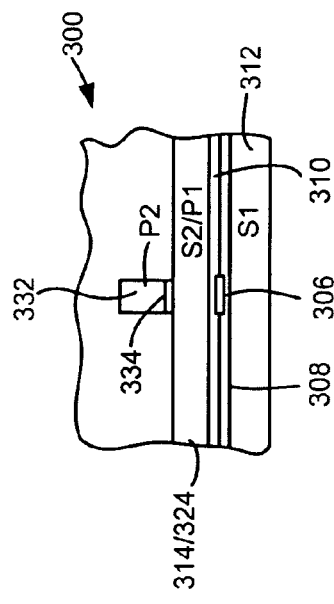

METHOD OF MAKING A WRITE HEAD LAPPING GUIDE ABOUT ALIGNED TO A NON-MAGNETIC LAYER SURROUNDING A WRITE POLE

FIELD OF THE INVENTION

The present invention relates to thin film processing, and more particularly, this invention relates to magnetic structures.

BACKGROUND OF THE INVENTION

The heart of a computer is a magnetic disk drive which typically includes a rotating magnetic disk, a slider that has read and write heads, a suspension arm above the rotating disk and an actuator arm that swings the suspension arm to place the read and/or write heads over selected circular tracks on the rotating disk. The suspension arm biases the slider into contact with the surface of the disk when the disk is not rotating but, when the disk rotates, air is swirled by the rotating disk adjacent an air bearing surface (ABS) of the slider causing the slider to ride on an air bearing a slight distance from the surface of the rotating disk. When the slider rides on the air bearing the write and read heads are employed for writing magnetic impressions to and reading magnetic signal fields from the rotating disk. The read and write heads are connected to processing circuitry that operates according to a computer program to implement the writing and reading functions.

SUMMARY OF THE INVENTION

A method in one embodiment comprises forming an electric lapping guide layer; forming a write pole; forming a first gap layer over the write pole; masking a portion of the first gap layer for defining a window over the write pole and at least a portion of the electric lapping guide layer; and forming a bump over the write pole in the window.

A method in another embodiment comprises forming an electric lapping guide layer; forming a write pole; forming a first gap layer over the write pole, the first gap layer not covering the electric lapping guide layer; masking a portion of the electric lapping guide layer, and a portion of the first gap layer for defining a window over the write pole; removing an exposed portion of the electric lapping guide layer; and forming a bump over the write pole in the window, wherein a back end of the electric lapping guide layer and a front end of the bump are about a same distance from an expected lapped surface of a head.

A system in one embodiment comprises an electric lapping guide layer; a write pole positioned to one side of the electric lapping guide layer; and a bump formed over the write pole in a window, wherein a back end of the electric lapping guide layer and a front end of the bump are about a same distance from a lapped surface of a head.

A system in another embodiment comprises leads previously coupled to an electric lapping guide layer; a write pole positioned to one side of the leads; and a bump formed over the write pole in a window, wherein the electronic lapping guide layer and the bump are about coplanar.

Other aspects, advantages and embodiments of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

FIG. 3A is a partial view of a merged magnetic head. FIG. 3B is a partial ABS view, not to scale, of the slider taken along plane 3B-3B of FIG. 3A.

DETAILED DESCRIPTION

Figure 1:
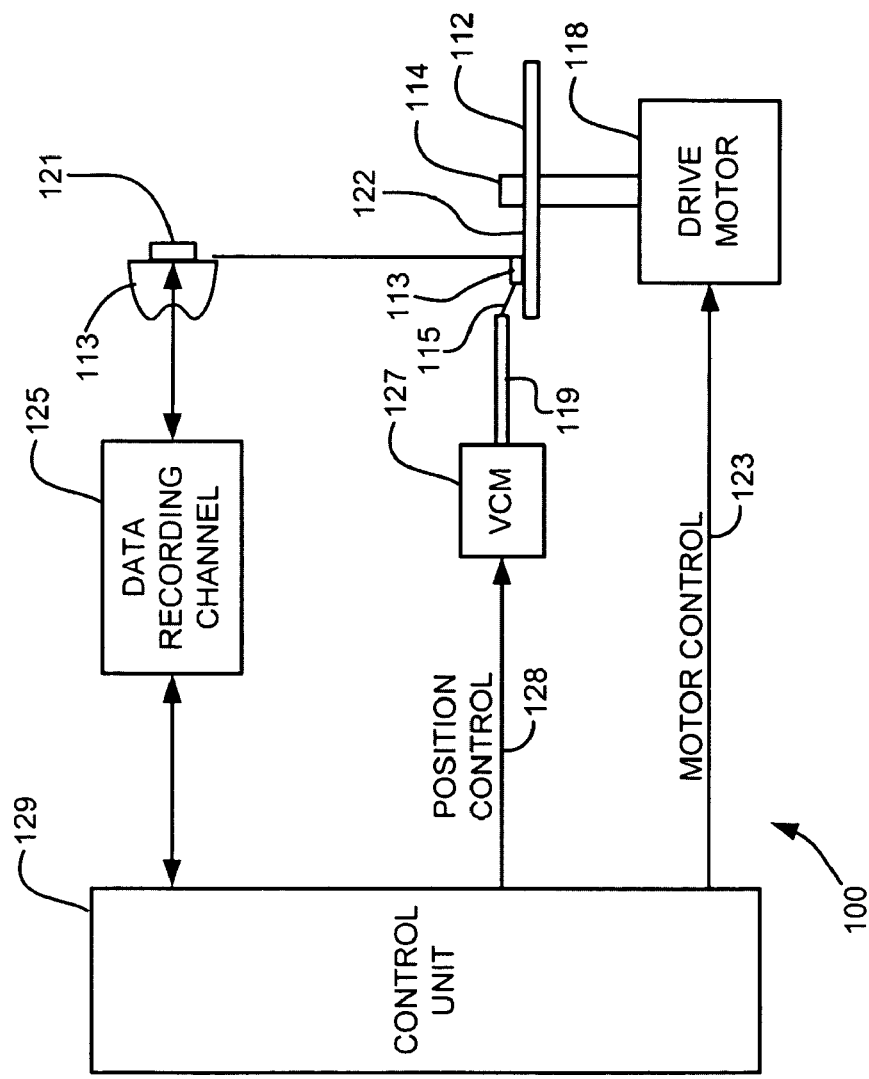
FIG. 1 is a simplified drawing of a magnetic recording disk drive system.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of thin film fabrication methods, as well as resultant structures formed therefrom including components for magnetic storage systems.

While much of the following description will describe fabrication of a pole for a perpendicular magnetic writer, it should be understood that this is done by way of example only, and the teachings herein have broad application to thin film processing in all areas.

In one general embodiment, a method is provided. According to the method, an electric lapping guide layer is formed. Additionally, a write pole is formed. Furthermore, a first gap layer is formed over the write pole. Still yet, a portion of the first gap layer is masked for defining a window over the write pole and at least a portion of the electric lapping guide layer. In addition, a bump is formed over the write pole in the window.

In another general embodiment, a method is provided. According to the method, an electric lapping guide layer is formed. Furthermore, a write pole is formed. Additionally, a first gap layer is formed over the write pole, the first gap layer not covering the electric lapping guide layer. Still yet, a portion of the electric lapping guide layer, and a portion of the first gap layer are masked for defining a window over the write pole. In addition, an exposed portion of the electric lapping guide layer is removed. Further, a bump is formed over the write pole in the window, wherein a back end of the electric lapping guide layer and a front end of the bump are about a same distance from an expected lapped surface of a head.

In another general embodiment, a structure is provided comprising an electric lapping guide layer, a write pole positioned to one side of the electric lapping guide layer, and a bump formed over the write pole in a window, wherein a back end of the electric lapping guide layer and a front end of the bump are about a same distance from a lapped surface of a head.

In another general embodiment, a structure is provided comprising leads previously coupled to an electric lapping guide layer, a write pole positioned to one side of the leads, and a bump formed over the write pole in the window, wherein the electronic lapping guide layer and the bump are about coplanar.

Referring now to FIG. 1, there is shown a disk drive 100 in accordance with one embodiment of the present invention. As shown in FIG. 1, at least one rotatable magnetic disk 112 is supported on a spindle 114 and rotated by a disk drive motor 118. The magnetic recording on each disk is in the form of an annular pattern of concentric data tracks (not shown) on the disk 112.

At least one slider 113 is positioned near the disk 112, each slider 113 supporting one or more magnetic read/write heads 121. As the disks rotate, slider 113 is moved radially in and out over disk surface 122 so that heads 121 may access different tracks of the disk where desired data are recorded. Each slider 113 is attached to an actuator arm 119 by means of a suspension 115. The suspension 115 provides a slight spring force which biases slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of disk 112 generates an air bearing between slider 113 and disk surface 122 which exerts an upward force or lift on the slider. The air bearing thus counter-balances the slight spring force of suspension 115 and supports slider 113 off and slightly above the disk surface by a small, substantially constant spacing during normal operation.

The various components of the disk storage system are controlled in operation by control signals generated by control unit 129, such as access control signals and internal clock signals. Typically, control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Read and write signals are communicated to and from read/write heads 121 by way of recording channel 125.

The above description of a typical magnetic disk storage system, and the accompanying illustration of FIG. 1 are for representation purposes only. It should be apparent that disk storage systems may contain a large number of disks and actuators, and each actuator may support a number of sliders.

An interface may also be provided for communication between the disk drive and a host (integral or external) to send and receive the data and for controlling the operation of the disk drive and communicating the status of the disk drive to the host, all as will be understood by those of skill in the art.

In a typical head, an inductive write head includes a coil layer embedded in one or more insulation layers (insulation stack), the insulation stack being located between first and second pole piece layers. A gap is formed between the first and second pole piece layers by a gap layer at an air bearing surface (ABS) of the write head. The pole piece layers may be connected at a back gap. Currents are conducted through the coil layer, which produce magnetic fields in the pole pieces. The magnetic fields fringe across the gap at the ABS for the purpose of writing bits of magnetic field information in tracks on moving media, such as in circular tracks on a rotating magnetic disk.

The second pole piece layer has a pole tip portion which extends from the ABS to a flare point and a yoke portion which extends from the flare point to the back gap. The flare point is where the second pole piece begins to widen (flare) to form the yoke. The placement of the flare point directly affects the magnitude of the magnetic field produced to write information on the recording medium. Since magnetic flux decays as it travels down the length of the narrow second pole tip, shortening the second pole tip will increase the flux reaching the recording media. Therefore, performance can be optimized by aggressively placing the flare point close to the ABS.

Figure 2A:
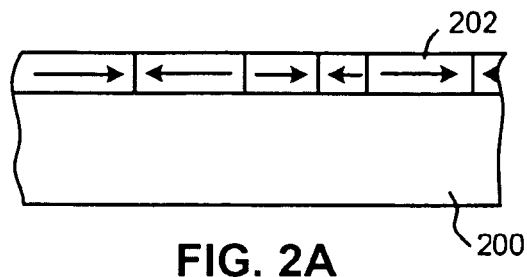
FIG. 2A is a schematic representation in section of a recording medium utilizing a longitudinal recording format.

FIG. 2A illustrates, schematically, a conventional recording medium such as used with conventional magnetic disc recording systems, such as that shown in FIG. 3A. This medium is utilized for recording magnetic impulses in or parallel to the plane of the medium itself. The recording medium, a recording disc in this instance, comprises basically a supporting substrate 200 of a suitable non-magnetic material such as glass, with an overlying coating 202 of a suitable and conventional magnetic layer.

Figure 2C:
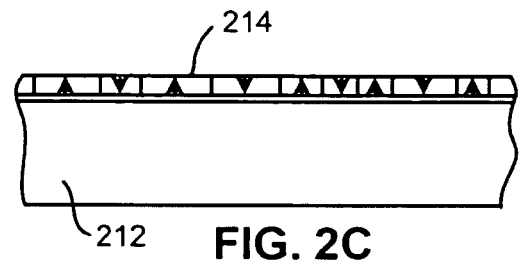
FIG. 2C is a magnetic recording medium utilizing a perpendicular recording format.
Figure 2B:
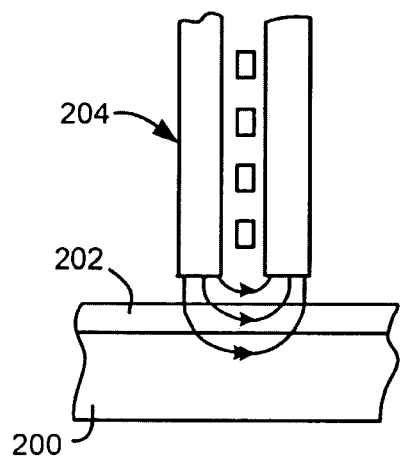
FIG. 2B is a schematic representation of a conventional magnetic recording head and recording medium combination for longitudinal recording as in FIG. 1.

FIG. 2B shows the operative relationship between a conventional recording/playback head 204, which may preferably be a thin film head, and a conventional recording medium, such as that of FIG. 2A.

FIG. 2C illustrates schematically the orientation of magnetic impulses substantially perpendicular to the surface of the recording medium. For such perpendicular recording the medium includes an under layer 212 of a material having a high magnetic permeability. This tinder layer 212 is then provided with an overlying coating 214 of magnetic material preferably having a high coercivity relative to the under layer 212.

Figure 2D:
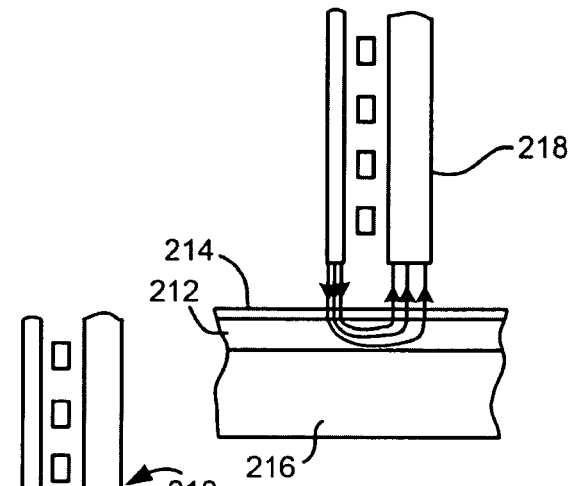
FIG. 2D is a schematic representation of a recording head and recording medium combination for perpendicular recording on one side.

Two embodiments of storage systems with perpendicular heads 218 are illustrated in FIGS. 2C and 2D (not drawn to scale). The recording medium illustrated in FIG. 2D includes both the high permeability under layer 212 and the overlying coating 214 of magnetic material described with respect to FIG. 2C above. However, both of these layers 212 and 214 are shown applied to a suitable substrate 216. Typically there is also an additional layer (not shown) called an "exchange-break" layer or "interlayer" between layers 212 and 214.

By this structure the magnetic lines of flux extending between the poles of the recording head loop into and out of the outer surface of the recording medium coating with the high permeability under layer of the recording medium causing the lines of flux to pass through the coating in a direction generally perpendicular to the surface of the medium to record information in the magnetically hard coating of the medium in the form of magnetic impulses having their axes of magnetization substantially perpendicular to the surface of the medium. The flux is channeled by the soft underlying coating 212 back to the return layer (P1) of the head 218.

Figure 2E:
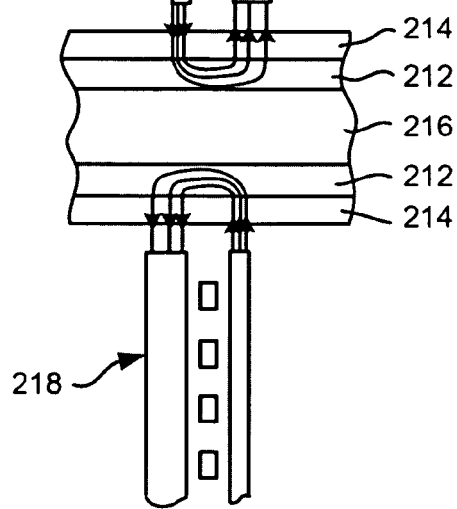
FIG. 2E is a schematic representation of the recording apparatus in accordance with one embodiment, similar to that of FIG. 2D, but adapted for recording separately on both sides of the medium.

FIG. 2E illustrates a similar structure in which the substrate 216 carries the layers 212 and 214 on each of its two opposed sides, with suitable recording heads 218 positioned adjacent the outer surface of the magnetic coating 214 on each side of the medium.

FIG. 3A is a side cross-sectional elevation view of a merged magnetic head 300, which includes a write head portion 302 and a read head portion 304, the read head portion employing a spin valve sensor 306. FIG. 3B is an ABS view of FIG. 3A. The spin valve sensor 306 is sandwiched between nonmagnetic electrically insulative first and second read gap layers 308 and 310, and the read gap layers are sandwiched between ferromagnetic first and second shield layers 312 and 314. In response to external magnetic fields, the resistance of the spin valve sensor 306 changes. A sense current ($I_s$) conducted through the sensor causes these resistance changes to be manifested as potential changes. These potential changes may then be processed as readback signals by processing circuitry (e.g. processing circuitry of the control unit 129 shown in FIG. 1).

The write head portion 302 of the magnetic head 300 includes a coil layer 322 sandwiched between first and second insulation layers 316 and 318. Note that the coils 322 are only partially shown, additional portions thereof being present outside the diagram. A third insulation layer 320 may be employed for planarizing the head to eliminate ripples in the second insulation layer caused by the coil layer 322. The first, second and third insulation layers are referred to in the art as an "insulation stack".

The coil layer 322 and the first, second and third insulation layers 316, 318 and 320 are sandwiched between first and second pole piece layers 324 and 326. The first and second pole piece layers 324 and 326 are magnetically coupled at a back gap 328 and have first and second pole tips 330 and 332 which are separated by a write gap layer 334 at the ABS. Since the second shield layer 314 and the first pole piece layer 324 are a common layer this head is known as a merged head. In a piggyback head, an insulation layer is located between a second shield layer and a first pole piece layer. First and second solder connections (not shown) connect leads (not shown) from the spin valve sensor 306 to leads (not shown) on the slider 113 (FIG. 1), and third and fourth solder connections (not shown) connect leads (not shown) from the coil 322 to leads (not shown) on the suspension.

Figure 4:
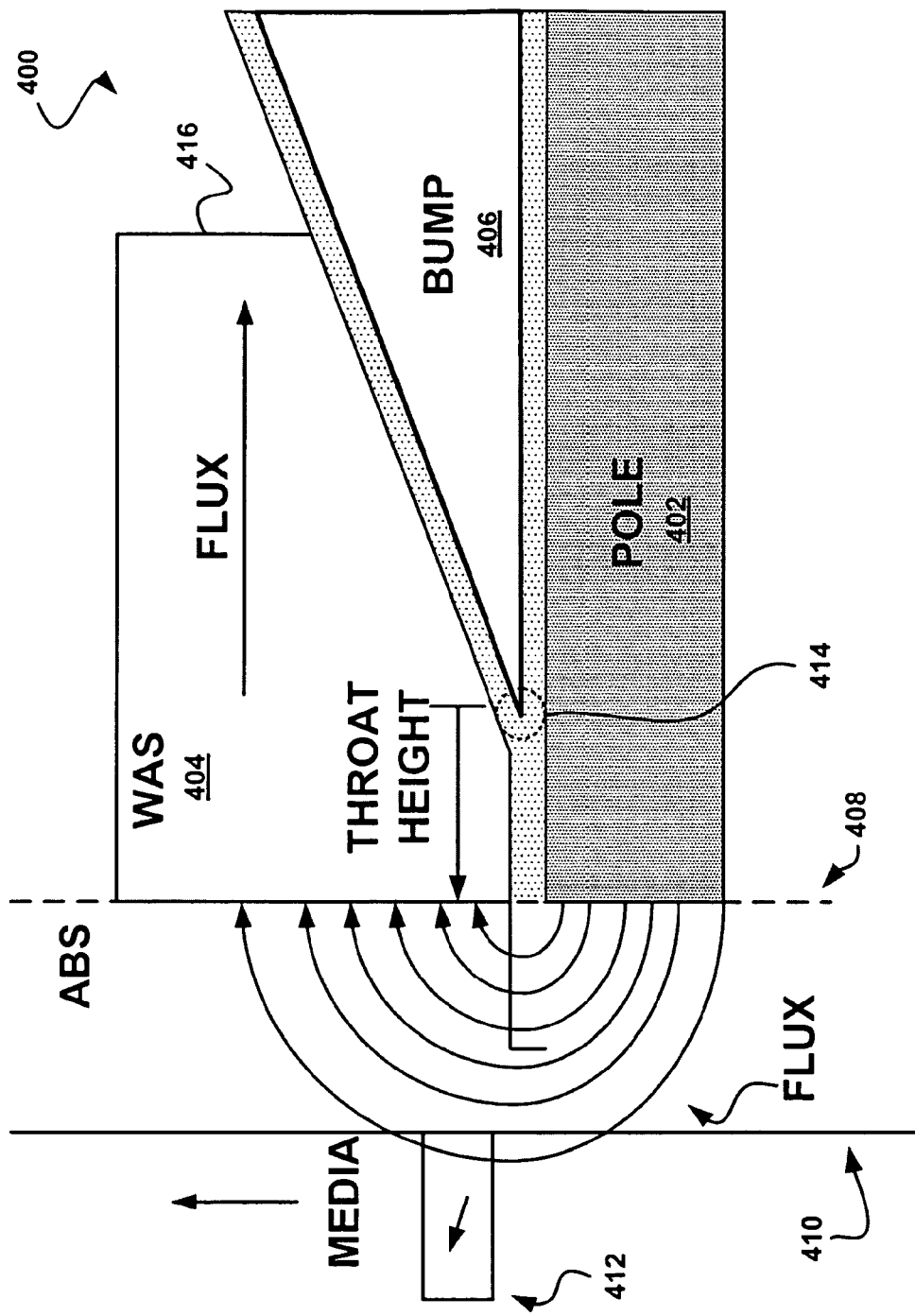
FIG. 4 illustrates a cross section view of a magnetic structure, in accordance with one embodiment.

FIG. 4 illustrates a cross section view of a magnetic structure 400, in accordance with one embodiment. As shown, a write pole 402, a wrap-around shield (WAS) 404, and a bump 406 are provided. However, the shield 404 can be a trailing shield that does not wrap around the pole 402 at the ABS 408. The pole 402 terminates at an air-bearing surface (ABS) 408.

In operation of the structure 400, flux exits the pole 402 and travels through media 410 prior to entering the WAS 404 or other flux return path. Ideally, most of the flux will enter the media 410 such that a bit 412 with a particular magnetic orientation may be written. The flux will then return and enter into the WAS 404, continuing to a back-gap (not shown). While most of the flux takes this path, some flux leaks into the WAS 404 across the gap positioned between the pole 402 and the WAS 404. Such flux leakage can be minimized by addition of the bump 406.

In various embodiments, the bump 406 may be a non-magnetic material, such as NiP, an alloy of NiP, chrome, etc. As an option, the bump 406 may be formed by a lift-off procedure.

As shown, the distance from a first end 414 of the bump 406 to the ABS surface 408 defines the throat height. Without the bump, the throat height would be defined by the distance from the ABS 408 to a back edge 416 of the WAS 404.

In this case, due to the wedge shape of the bump 406, the maximum flux leakage into the WAS 404 will be close to the ABS surface 408. Since the height of the bump 406 is less than the height of the WAS 404, thinner resist (e.g. 193 nm resist, 248 nm resist, etc.) may be used to form the bump 406. As a result, a more refined lithography tool may be used to place the end 414 of the bump 406 close to the ABS surface 408 with better accuracy.

As good as the lithography tools are, there is an inherent uncertainty in any manufacturing process because every structure must be aligned to something else. In a piggyback head, for example, the writer may be aligned to the back corner of the sensor. In one embodiment of the present invention, the end 414 of the bump 406 is about aligned to a writer electronic lapping guide (WELG). A WELG positioned near a pole allows measurement of an extent of lapping of the pole, allowing precise lapping to the desired position of the ABS.

Figure 5:
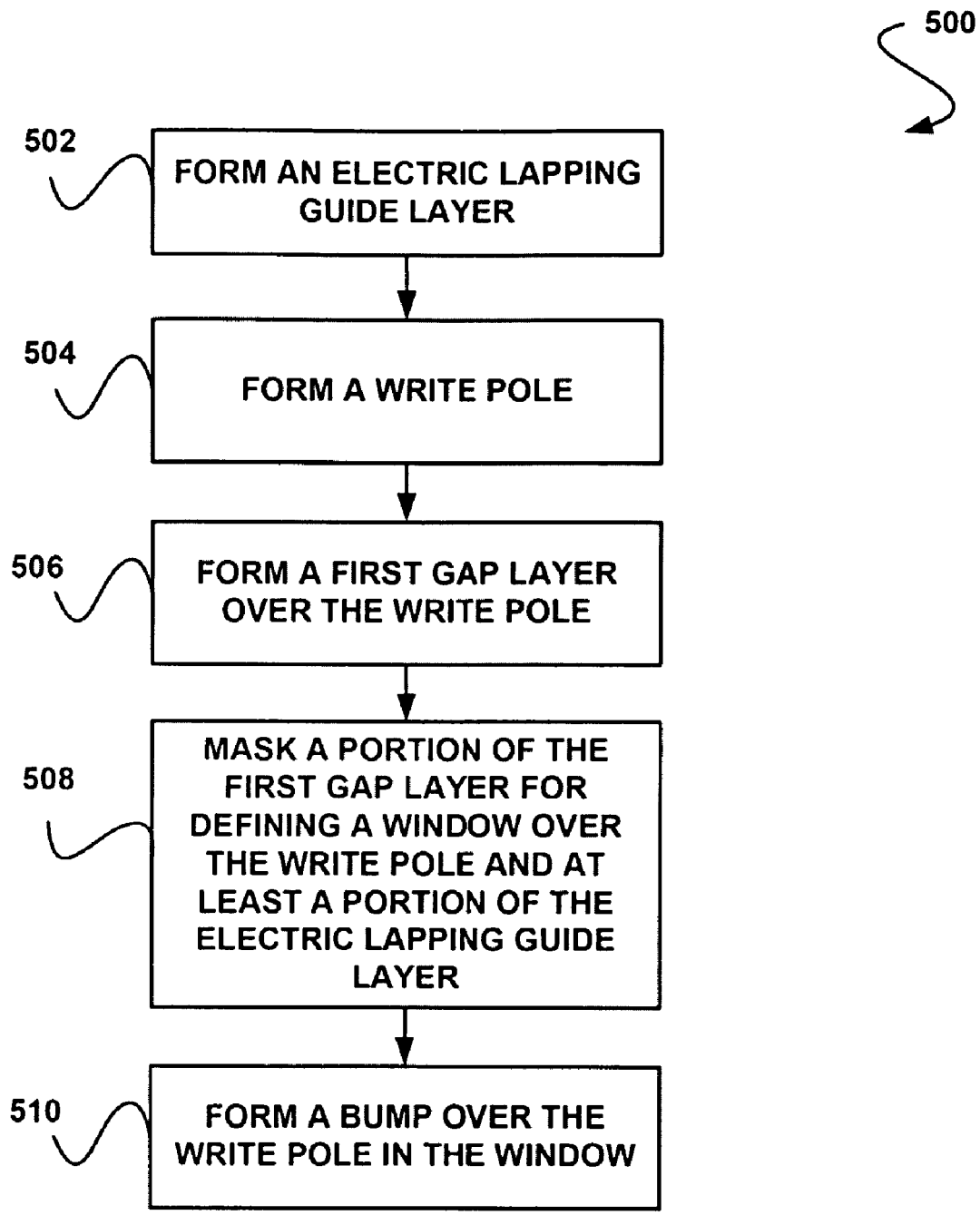
FIG. 5 shows a method for aligning a write head lapping guide to a non-magnetic layer surrounding a write pole, in accordance with one embodiment.

FIG. 5 shows a method 500 for aligning a write head lapping guide to a non-magnetic layer surrounding a write pole, in accordance with one embodiment. As shown, an electric lapping guide layer is formed. See operation 502. Additionally, a write pole is formed. See operation 504.

Furthermore, a first gap layer is formed over the write pole. See operation 506. It should be noted that the first gap layer may function as a gap in the completed device, or may be a transitory layer. In one embodiment, the first gap layer may not cover the electric lapping guide layer. As an option, an exposed portion of the electric lapping guide layer may be removed.

As shown further, a portion of the first gap layer is masked for defining a window over the write pole and at least a portion of the electric lapping guide layer. See operation 508. In addition, a bump is formed over the write pole in the window. See operation 510. In one embodiment, a back end of the electric lapping guide layer and a front end of the bump may be about a same distance from an expected lapped surface of the head.

It should be noted that the electric lapping guide layer and the bump may have different compositions. For example, the electric lapping guide layer may include Tungsten (W) or Molybdenum (Mo). On the other hand, the bump may include NiP or a NiP alloy. Furthermore, as an option, the bump may be plated (e.g. electrically plated).

As an option, only a portion of the electric lapping guide layer may be masked. In this case, an exposed portion of the electric lapping guide layer may be removed. For example, the exposed portion of the electric lapping guide layer may be removed by etching.

In one embodiment, the electronic lapping guide layer and the bump may be about coplanar. In other words, some portion of the electronic lapping guide layer and the bump may be in, or almost in, a common plane. In another embodiment, the electronic lapping guide layer and the write pole may be about coplanar. In other words, some portion of the electronic lapping guide layer and the write pole may be in, or almost in, a common plane.

As an option, a second gap layer may be formed. In this case, the second gap layer may include at least two portions, where at least two of the portions of the second gap layer are in electrical communication with the electric lapping guide layer. It should be noted that the two portions may be disconnected, or part of a continuous layer.

As another option, a wrap around shield (WAS) layer may be added above the write pole and the two portions of the second gap layer that are in electrical communication with the electric lapping guide layer. Furthermore, some or all of the exposed portions of the second gap layer may be removed. Additionally, electrical contacts may be formed above the wrap around shield layer formed above the two portions of the second gap layer that are in electrical communication with the electric lapping guide layer.

Using the method 500, a structure may be formed using a write head electric lapping guide that is aligned to a bump and is connected with a portion of the first and/or second gap layer after bump formation. Additionally, a flare point/bump defining mask may be used to form a back edge of the writer electric lapping guide. FIGS. 6-15 illustrate structures formed utilizing techniques described herein, in accordance with various embodiments.

Figure 6:
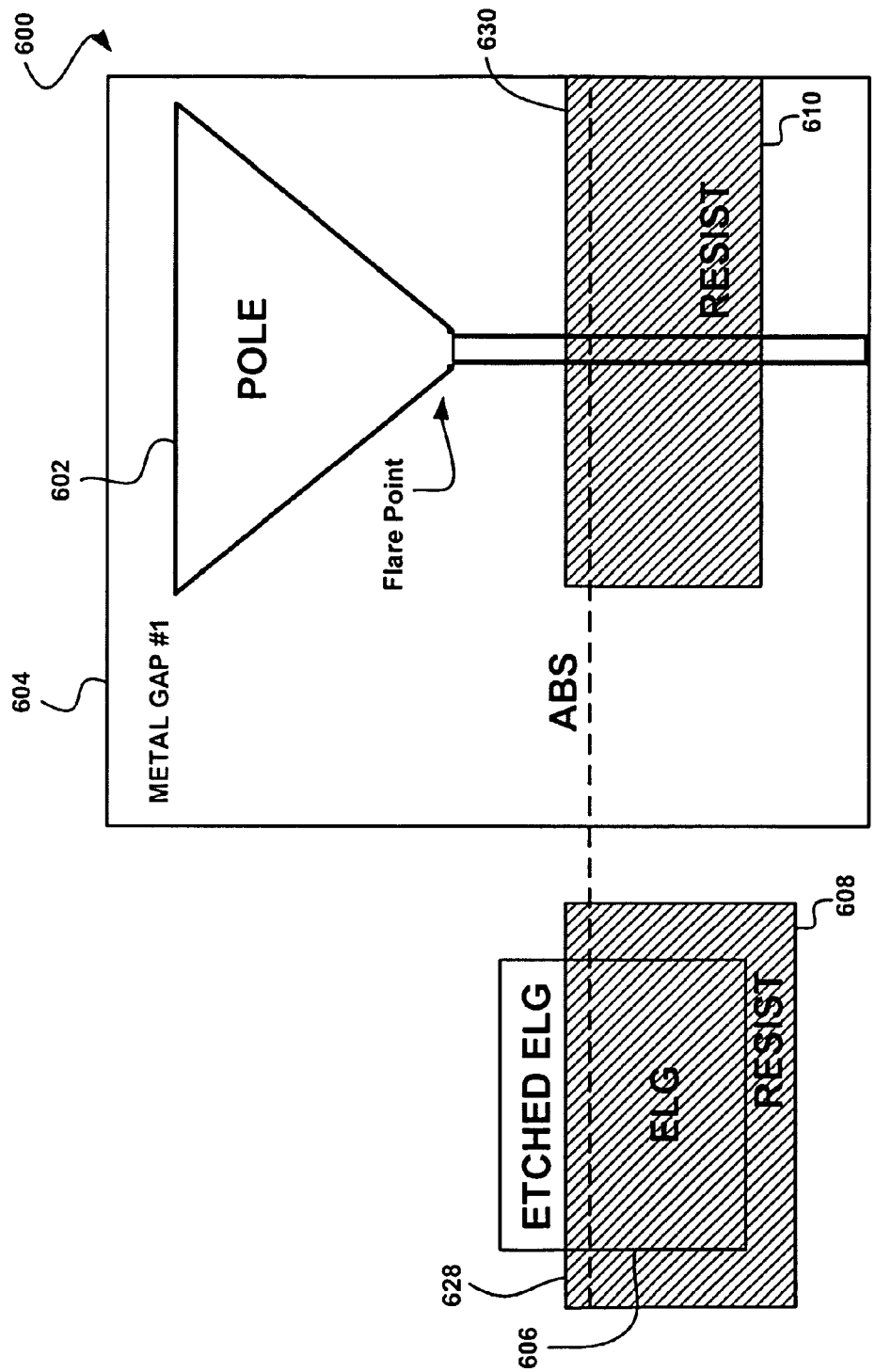
FIGS. 6-15 illustrate structures formed utilizing techniques described herein, in accordance with various embodiments.

FIG. 6 shows a top-down view of a magnetic structure 600 as seen from a direction about parallel to the ABS surface. As shown, a write pole 602 and a first gap material 604 used for a first gap layer are deposited. In various embodiments, the gap material may include $Al_2O_3$, Rh, Au, Ta, NiP, Cr or any suitable non-magnetic material.

Additionally, the pole 602 may be provided utilizing any suitable process such as a plating process, a subtractive process such as milling, etc. As an option, the pole 602 may comprise a laminate structure, CoFe, or any other suitable material. In operation, the gap material 604 may be deposited around the pole 602, followed by etching of the excess gap material 604. As an option, the excess gap material 604 may be milled using any suitable milling process.

As shown further, material for forming an electric lapping guide (ELG, or WELG) layer 606 is deposited about coplanar with the pole 602. In one embodiment, the ELG material may include Tungsten (W). In various other embodiments, the ELG material may include any metal capable of being etched (e.g. Ti, Ta, Mo, V, etc.). Alloys of the foregoing can also be used. In addition to the ELG layer 606, resist layers 608 and 610 are formed over the ELG layer 606 and the pole 602. In this case, the resist layers 608 and 610 may be collinear and have back edges 628, 630 which are substantially coplanar with each other. Additionally, the resist layers 608 and 610, and the ELG material 606 may extend beyond the ABS, as shown.

After the resist layers 608 and 610 have been formed, a patch of the ELG layer 606 not coved by the resist layer 608 may be etched using any suitable etching process such as reactive ion etching (RIE). For example, the etching process may include a Fluorine (F) based RIE such as $CF_4$ or $SF_6$ RIE. As an option, the ELG material not coved by the resist material may be removed prior to removing any flare defining mask. In this case, a RIE process would have minimal impact on any exposed portion of the pole 602.

Figure 7:
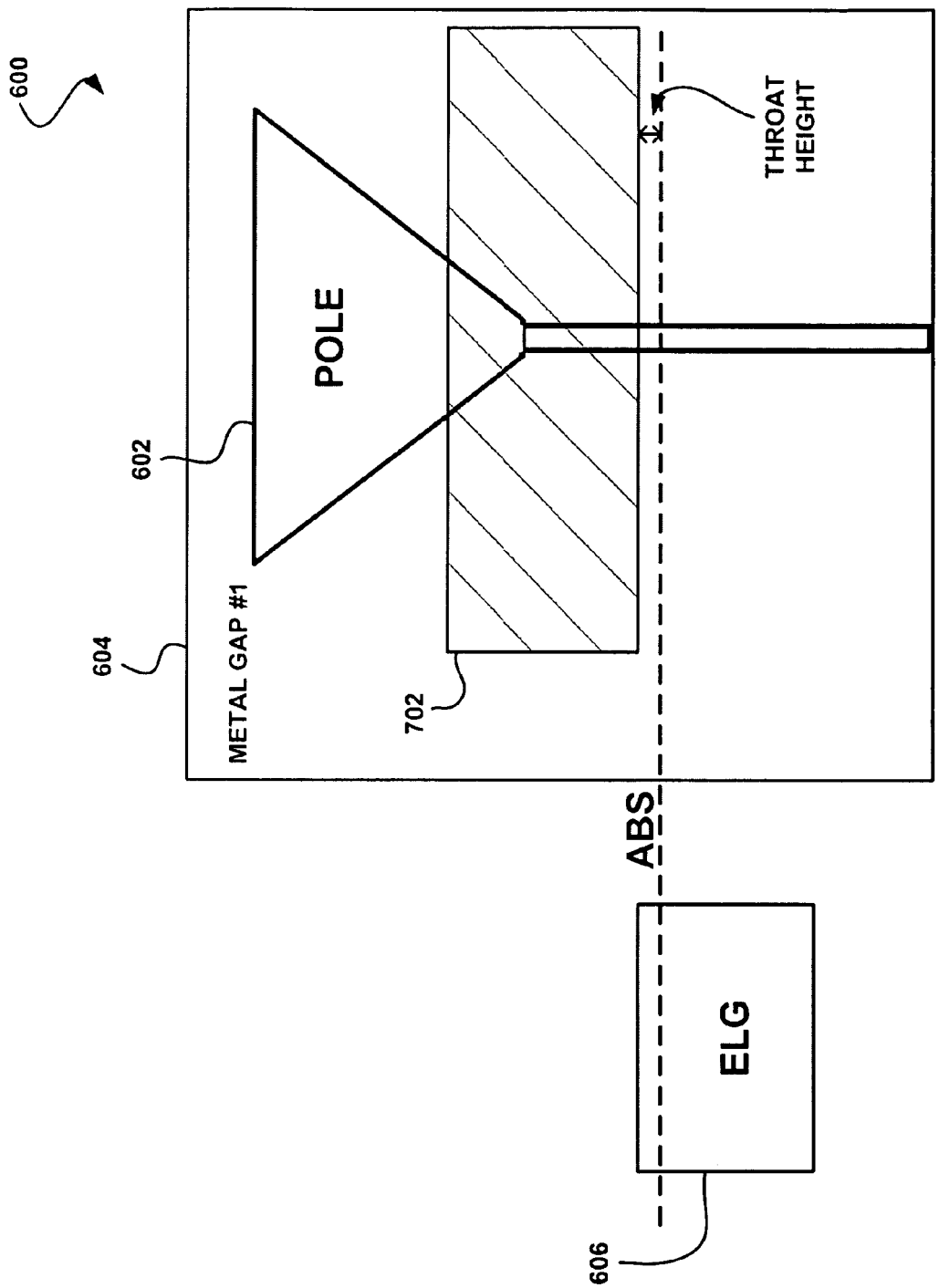

In addition to etching the ELG layer 606 not coved by the resist layer 608, a non-magnetic material such as NiP may be electrically plated to form a bump 702 over the pole 602, before the resist material 610 is removed (e.g. see FIG. 7). In this case, the material of the ELG layer 606 (e.g. W) will not be readily dissolvable in the solution used in the electrical plating process (e.g. a NiP solution). Further, it should be noted that the distance from the bottom edge of the bump 702 to the ABS is the throat defining height. As a note, mask 610 may conform to have an opening that would produce the bump 702.

Figure 8:
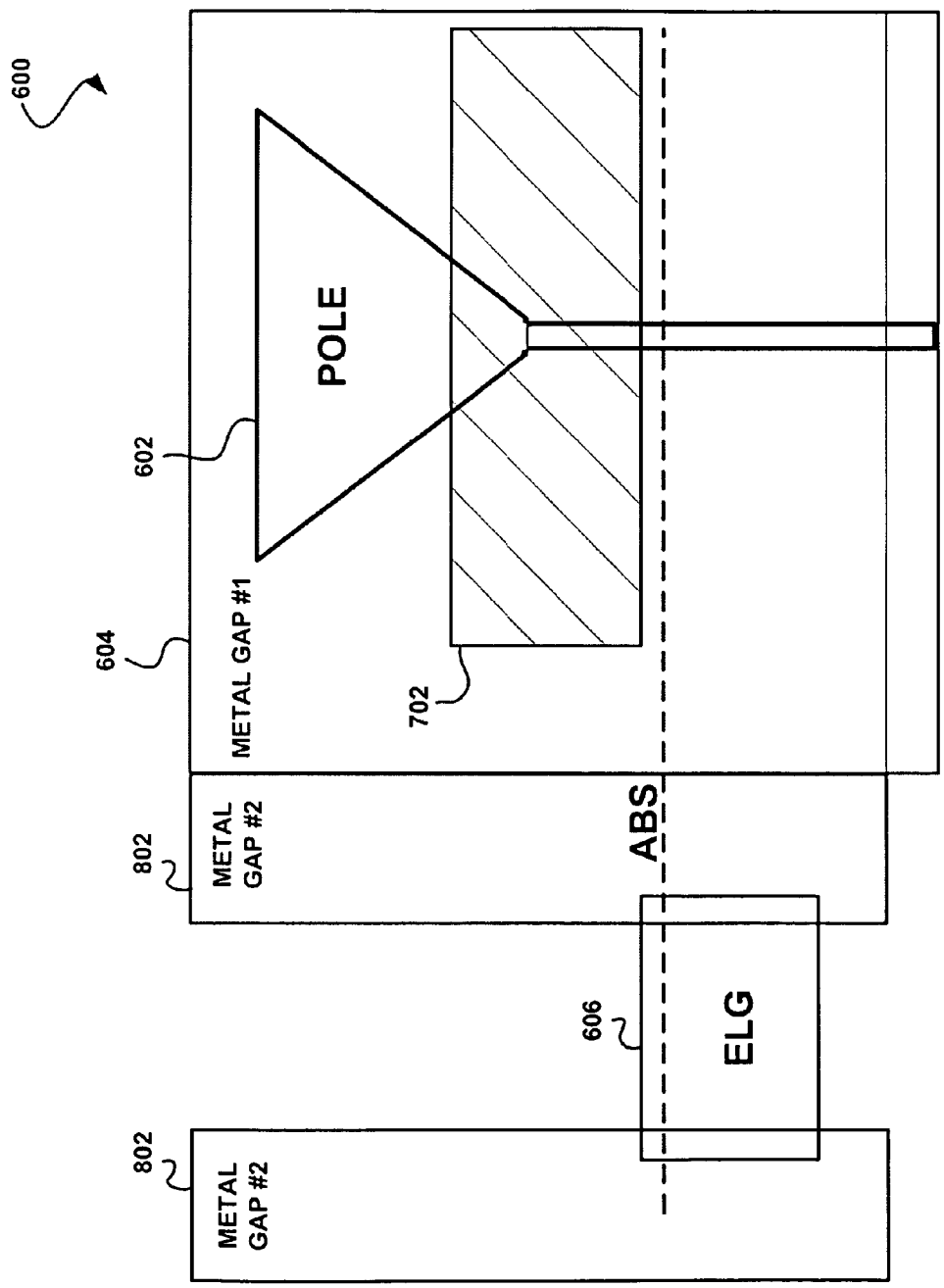

Once the resist layers 608 and 610 have been removed, a second gap material 802 used for a second gap layer is deposited, as shown in FIG. 8. In this case, the second gap material 802 may overlap the ELG layer 606, as shown. This overlap may be utilized as an electrical connection to the ELG. As an option, the second gap material 802 may also be deposited over the bump 702. Thus, the first gap layer material 604 and optionally the second gap layer material 802 may be positioned between the pole 602 and any wrap around shield or other flux return structure formed.

Figure 9:
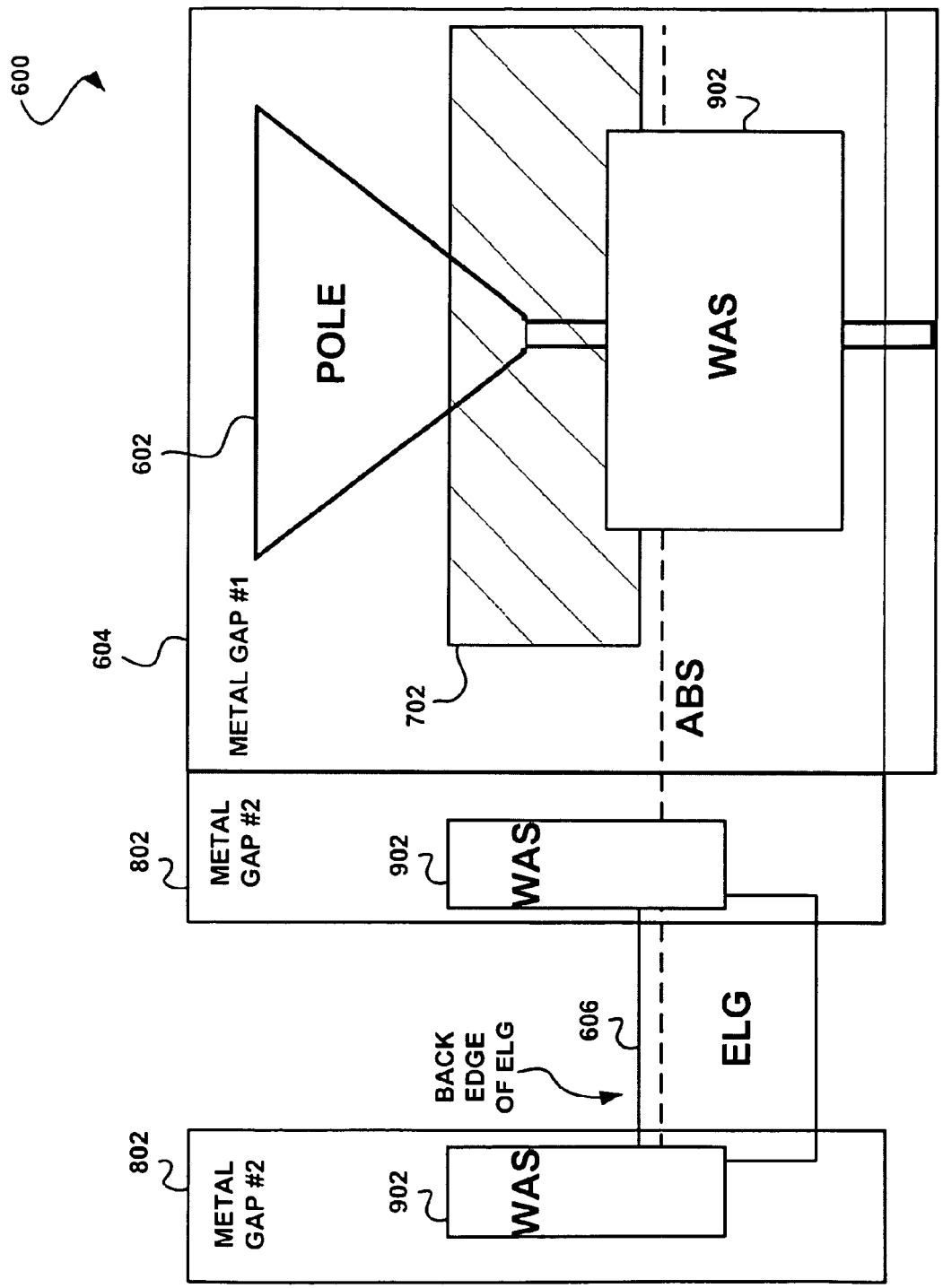

As shown in FIG. 9, one or more Wrap Around Shields (WAS) 902 may also be formed. The bump 702 and/or at least one of the wrap-around shields 902 may then be utilized as stud connections for the ELG. At this point, the magnetic structure 600 is formed such that the back edge of the ELG layer 606 is aligned about to the throat-defining bump 702.

Figure 10:
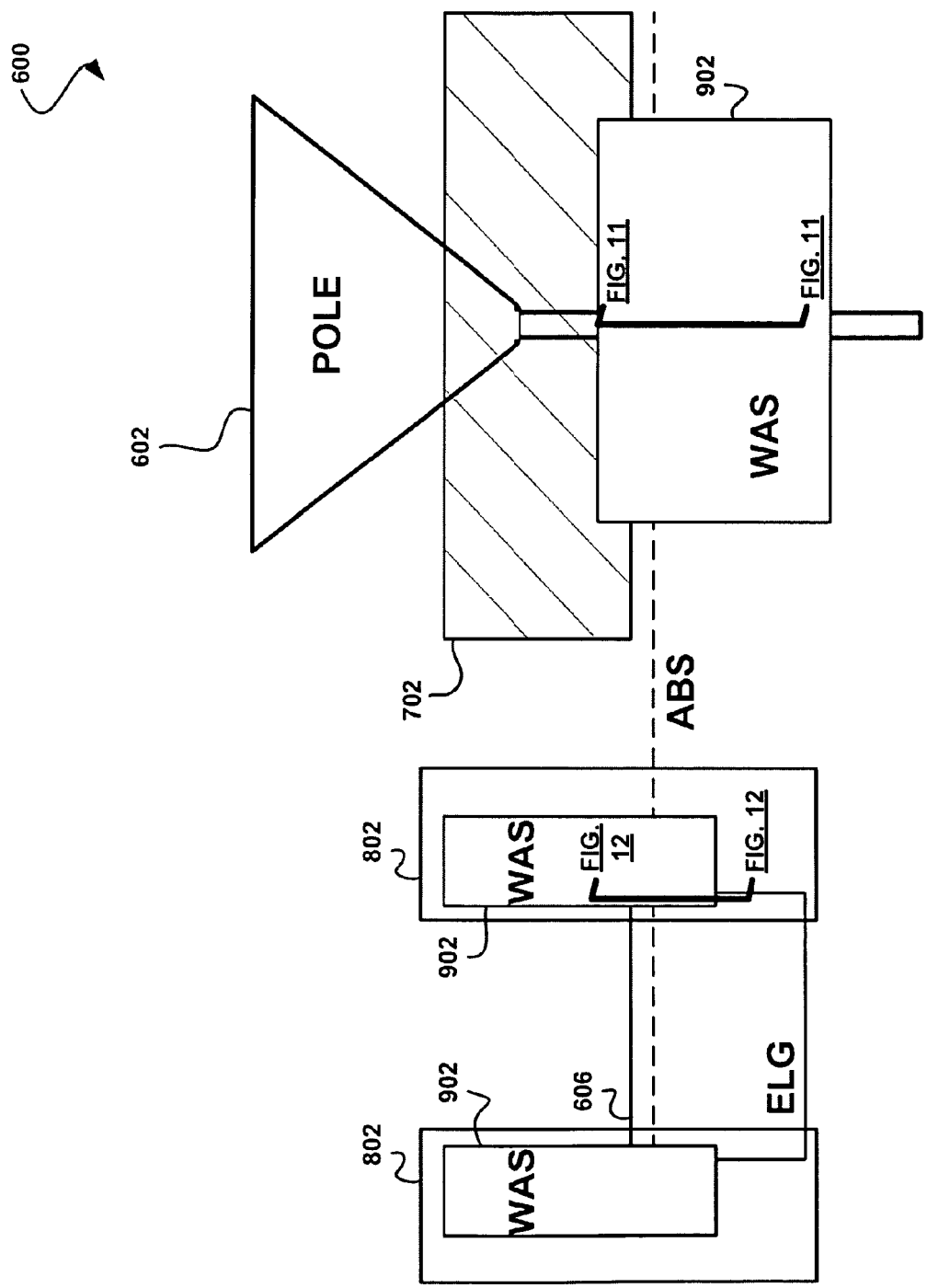

Any excess metal (e.g. the second gap material 802) around the ELG layer 606 may be removed in an etching process, resulting in the structure shown in FIG. 10. Additionally, another photo-lithography process may be utilized to remove the remaining gap material (e.g. the first and/or second gap material). Furthermore, the remaining material below the ABS may be lapped off at this point, using the ELG as a guide in a conventional manner. In one approach, the wrap around shields 902 adjacent the ELG 606 form part of the conductive path to and from the ELG. As material is lapped from the structure, the ELG becomes thinner and thinner, thereby reducing its cross sectional area and thus increasing its electrical resistance. By passing a current through the ELG during lapping, and measuring the change in resistance of the ELG, the amount of material lapped from the structure can be estimated.

Figure 11:
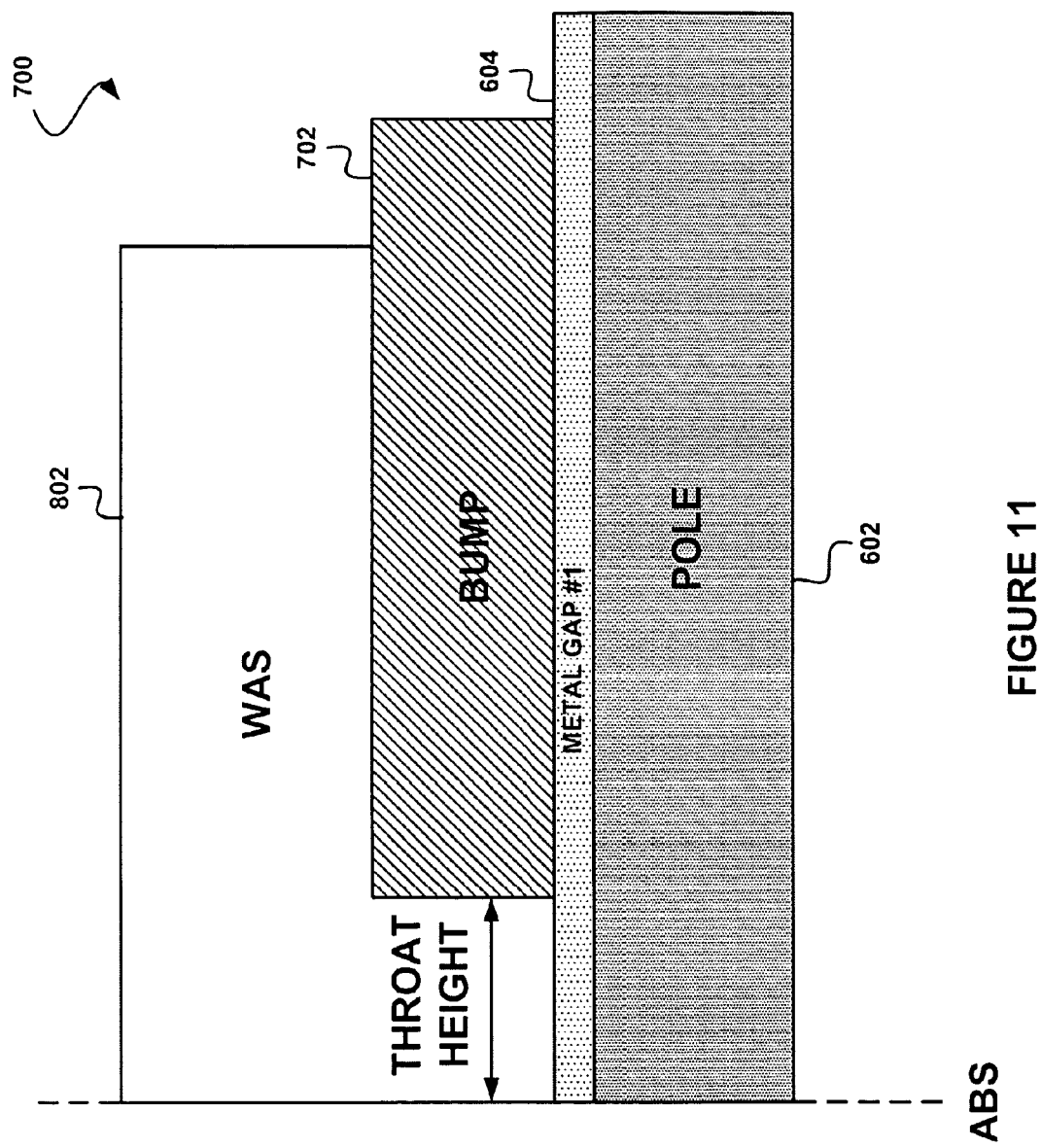
Figure 12:
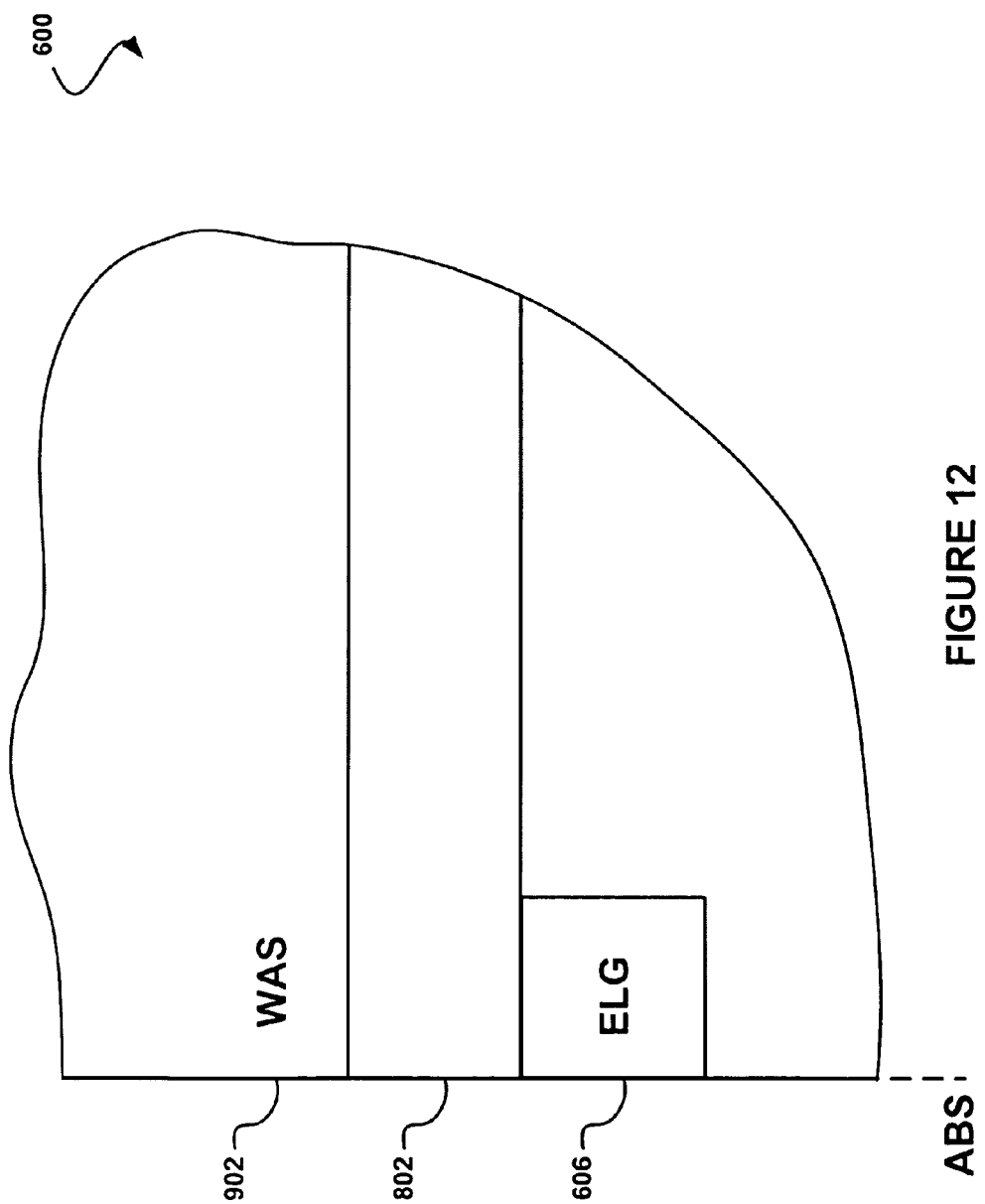

FIGS. 11 and 12 illustrate cross section views of the magnetic structure 600 of FIG. 10 after the lapping, in accordance with one embodiment. Note that, typically, additional layers would be added prior to lapping, but they have been omitted here for clarity. It should also be noted that the bump 702 may take various forms in different embodiments. For example, the bump 702 may have rectangular shape or a wedge shape, etc. In either case, the front edge of the bump 702 is about aligned to a back edge of the ELG.

Figure 13:
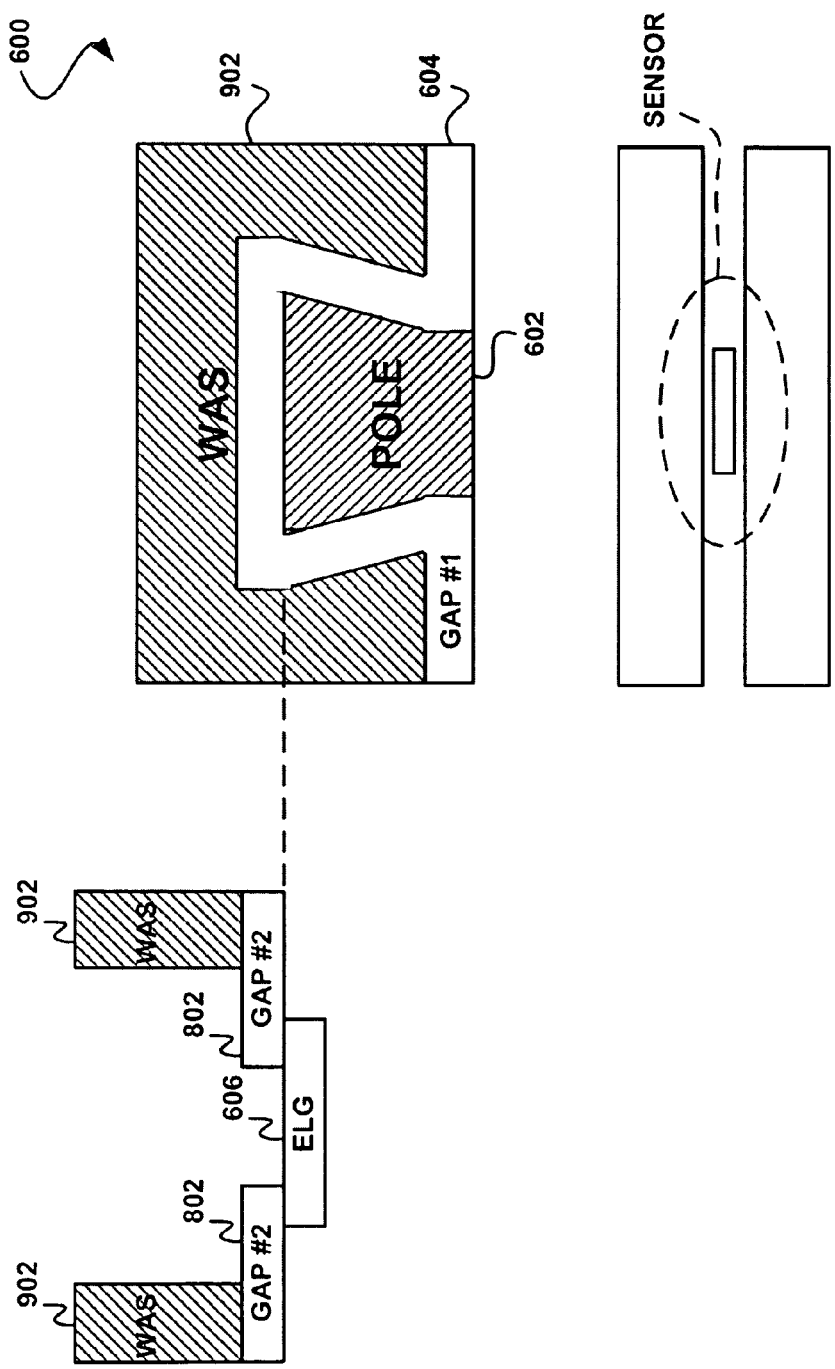

FIG. 13 illustrates an ABS view of the magnetic structure 600 after lapping, in accordance with one embodiment. The WAS studs 902 may be buried in the head behind the ABS, but preferably, as shown, the studs 902 are exposed at the ABS (at this point in the structure's life). This configuration may allow the minimization of lead resistance. As another option, the WAS studs 902 may be buried in the structure behind the ABS. A sensor (SENSOR) is shown to demonstrate a piggybacked transducer configuration.

Figure 14:
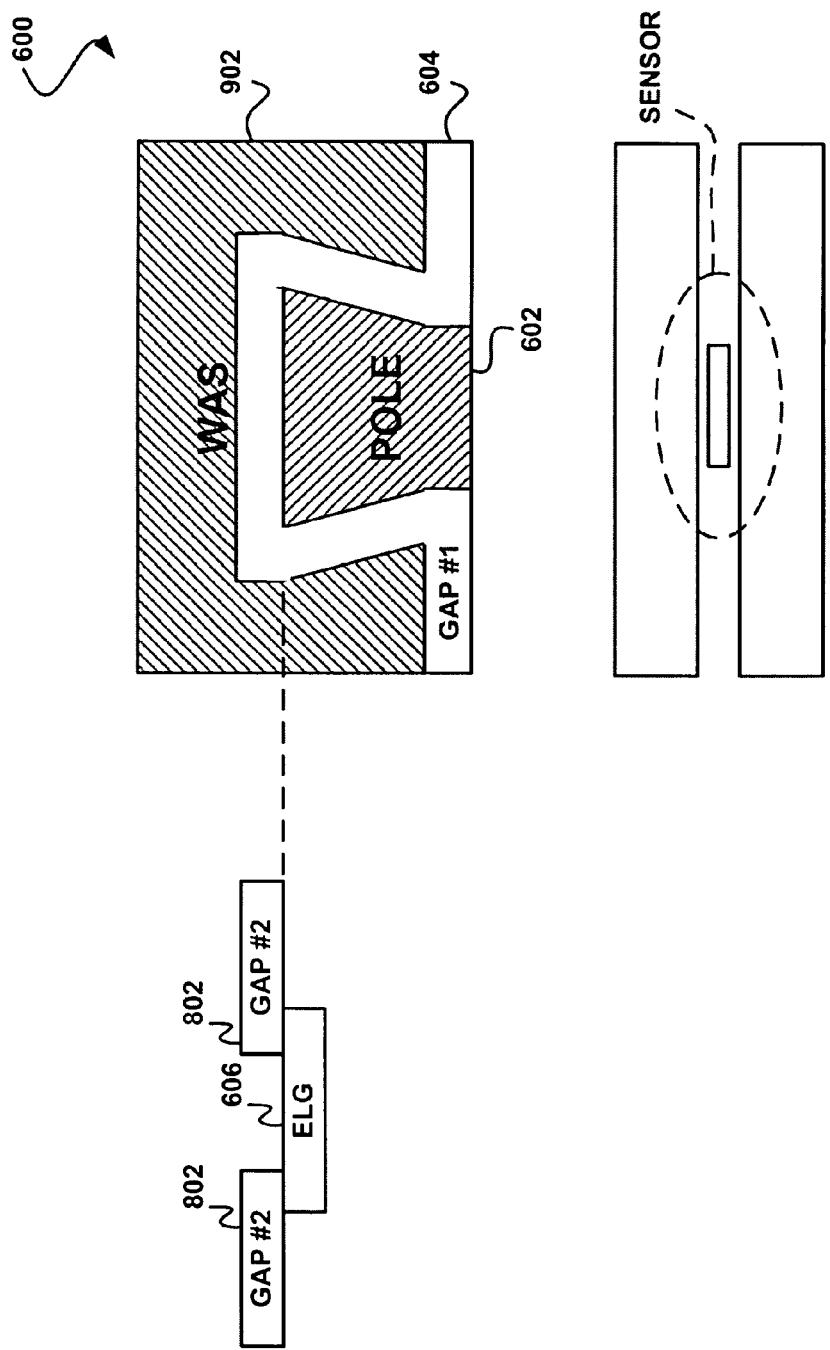

FIG. 14 illustrates an ABS view of the magnetic structure 600 after lapping, in accordance with another embodiment. In this case, the WAS studs 902 extending from the second gap layers 802 are buried behind the ABS. It should be noted that a material for the lead from the ELG layer 606 to connection stubs on a slider may be different and separate from the ELG material, the WAS material, and/or connection stub material.

Figure 15:
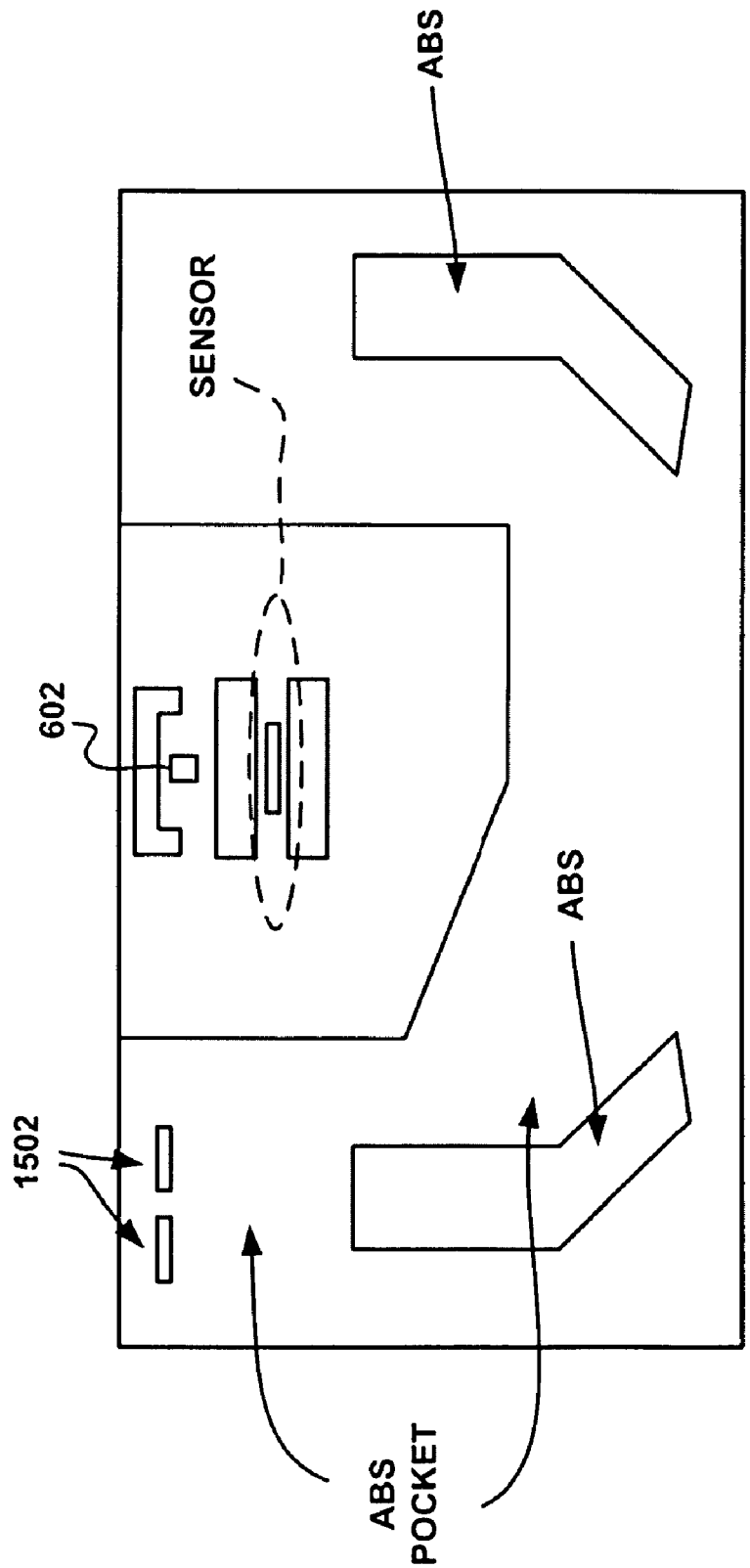

FIG. 15 illustrates a cross section view of the magnetic structure 600 after the lapping, and after further etching to define the final ABS and ABS pockets recessed therefrom, in accordance with yet another embodiment. As shown, the ELG 606 may be removed during definition of the final ABS. In this case, leads 1502 previously coupled to the ELG layer may be exposed. As an option, the leads 1502 may be exposed after an ABS pocket has been etched to form the ABS.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
   forming an electric lapping guide layer;
   forming a write pole;
   forming a first gap layer over the write pole;
   masking a portion of the first gap layer for defining a window over the write pole and at least a portion of the electric lapping guide layer; and
   forming a bump over the write pole in the window.

2. The method as recited in claim 1, wherein only a portion of the electric lapping guide layer is masked, and further comprising removing an exposed portion of the electric lapping guide layer.

3. The method as recited in claim 2, wherein the exposed portion of the electric lapping guide layer is removed by etching.

4. The method as recited in claim 1, wherein the electronic lapping guide layer and the bump are about coplanar.

5. The method as recited in claim 1, wherein the electronic lapping guide layer and the write pole are about coplanar.

6. The method as recited in claim 1, wherein a back end of the electric lapping guide layer and a front end of the bump are about a same distance from an expected lapped surface of the write pole.

7. The method as recited in claim 1, wherein the electric lapping guide layer and the bump have different compositions.

8. The method as recited in claim 1, wherein the bump is plated.

9. The method as recited in claim 1, further comprising forming a second gap layer, two portions of the second gap layer being in electrical communication with the electric lapping guide layer.

10. The method as recited in claim 9, further comprising adding a wrap around shield layer above the write pole and the two portions of the second gap layer that are in electrical communication with the electric lapping guide layer.

11. The method as recited in claim 10, further comprising removing exposed portions of the second gap layer.

12. The method as recited in claim 11, further comprising forming electrical contacts above the wrap around shield layer formed above the two portions of the second gap layer, the electrical contacts being in electrical communication with the electric lapping guide layer.

13. A method, comprising:
    forming an electric lapping guide layer;
    forming a write pole;
    forming a first gap layer over the write pole, the first gap layer not covering the electric lapping guide layer;
    masking a portion of the electric lapping guide layer, and a portion of the first gap layer for defining a window over the write pole;
    removing an exposed portion of the electric lapping guide layer; and
    forming a bump over the write pole in the window, wherein a back end of the electric lapping guide layer and a front end of the bump are about a same distance from an expected lapped surface of a head.

14. The method as recited in claim 13, wherein the exposed portion of the electric lapping guide layer is removed by etching.

15. The method as recited in claim 13, wherein the electronic lapping guide layer and the bump are about coplanar.

16. The method as recited in claim 13, wherein the electronic lapping guide layer and the write pole are about coplanar.

17. The method as recited in claim 13, wherein the electric lapping guide layer and the bump have different compositions.

18. The method as recited in claim 13, wherein the bump is plated.

19. The method as recited in claim 13, further comprising forming a second gap layer having at least two portions, two of the portions of the second gap layer being in electrical communication with the electric lapping guide layer.

20. The method as recited in claim 19, further comprising adding a wrap around shield layer above the write pole and the two portions of the second gap layer that are in electrical communication with the electric lapping guide layer.

21. The method as recited in claim 20, further comprising removing exposed portions of the second gap layer.

* * * * *

UNITED STATES PATENT AND TRADEMARK OFFICE
CERTIFICATE OF CORRECTION

PATENT NO.         : 8,161,627 B2                                            Page 1 of 1
APPLICATION NO.    : 12/110705
DATED              : April 24, 2012
INVENTOR(S)        : Bonhote et al.

It is certified that error appears in the above-identified patent and that said Letters Patent is hereby corrected as shown below:

col. 4, line 49 replace "tinder" with --under--.

Signed and Sealed this
Nineteenth Day of June, 2012

David J. Kappos
*Director of the United States Patent and Trademark Office*